INVENTOR.
E. DANE HARVEY
BY
P.H. Fisht
ATTORNEY.

PRESSURE-TIME & THRUST-TIME CURVE
FOR OPEN HEAD-END ROCKET

PRESSURE-TIME & THRUST-TIME CURVES
FOR SOLID HEAD-END CHAMBERLESS ROCKET

THRUST-TIME CURVES FOR OPEN HEAD-END ROCKET

THRUST-TIME CURVES
FOR SOLID HEAD-END CHAMBERLESS ROCKET

INVENTOR.
E. DANE HARVEY

ATTORNEY.

United States Patent Office 3,379,010
Patented Apr. 23, 1968

3,379,010
CHAMBERLESS ROCKET
Edwin D. Harvey, Frostburg, Md., assignor, by mesne assignments, to the United States of America as represented by the Secretary of the Navy
Filed Jan. 3, 1962, Ser. No. 164,201
1 Claim. (Cl. 60—253)

The present invention relates to "chamberless" rockets, and more particularly to propellant grains that can be fired in form completely devoid of metal parts.

In the conventional rocket propellant, a metal chamber or case is employed for housing the propellant system under elevated pressures, e.g., in the order of several thousand p.s.i. The chamber or case must be precision made so as to be capable of disassembly and to enable insertion of the propellant grain into the system. The metal parts add little or nothing to impulse and yet they represent a high percentage of dead weight. Frequently the design and actual fabrication of metal rocket cases, nozzles, and associated components prove to be the most expensive and time consuming operations in rocket manufacture.

The general purpose of this invention is to provide new propellant grain assemblies devoid of metal encasement, and with no need for conventional metal external components.

An object of the present invention is the provision of a "chamberless" rocket; that is, a rocket without an exterior metal casing.

Another object is to provide a rocket propellant which serves as its own pressure vessel.

A further object of the invention is to provide a cast rocket propellant which can be fired without need for a metal chamber or metal nozzle parts.

Still another object is to provide a rocket system which has the economic advantages of reduced time, equipment and labor in the manufacture thereof.

Yet another object is to provide a rocket with a natural aptitude to become frangible if so desired.

A still further object is to provide a rocket useful as a booster for ground-to-ground, ground-to-air, air-to-air, and air-to-ground applications.

A further object is to provide a rocket propellant system with increased loading density by replacement of the metal encasement with powder grain material.

Other objects, features and many of the attendant advantages of this invention will be readily appreciated as the same become better understood by reference to the following detailed description and when considered in connection with the accompanying diagrammatic drawings and graphs.

In accordance with the invention, a rocket propellant is provided which is free from metal encasement and which comprises a perforated smokeless powder grain; a first section of a solid low energy plastic material connected with one end of said grain as an end closure therefor; and a second section of a low energy plastic material, containing a perforation, and connected with the opposite end of said propellant grain as a nozzle member therefor. Further, in accordance with the present invention, a method is provided for the preparation of a cast smokeless powder rocket suitable for firing without being metal encased, which comprises introducing a first mass of granules of a low energy plastic material into a container, superimposing on said plastic granules a mass of granules of smokeless powder and maintaining a perforation in the last said mass, superimposing a second mass of low energy plastic granules on said smokeless powder granules, and maintaining a perforation therein coaxial with the perforation maintained in said mass of smokeless powder granules, in the form of a nozzle; passing a nonvolatile plasticizer through the resulting body of granules within said container in an amount to completely surround all of said granules; and curing the resulting mass to form a cast body, thereby forming a cast propellant which can be fired without being totally encased in metal.

Figure 1:
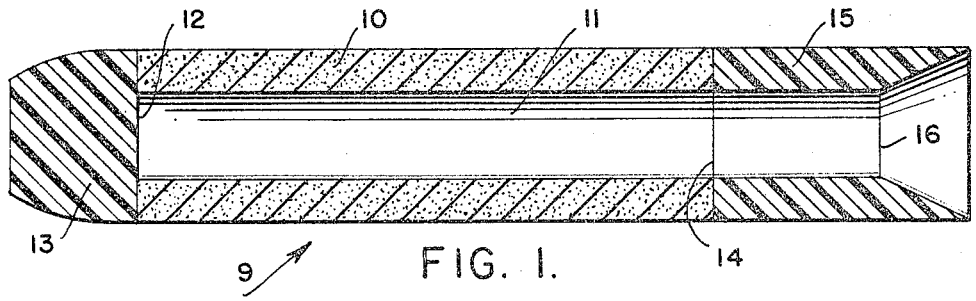
FIG. 1 is a diagrammatic design of a chamberless solid propellant rocket with a closed head end of low energy plastic material and a nozzle of the same material.

Referring now to the drawings, in FIG. 1 there is shown a chamberless or caseless rocket of the present invention, comprising a rocket 9 composed of a smokeless powder or solid propellant grain section 10 with a single perforation 11 closed at end 12 with a solid section 13 of low energy plastic material, and a nozzle section 15 also made from a low energy plastic material and contains a perforation 16 therethrough. Nozzle 15 is coaxially aligned with grain section 10 at its open end 14; the walls forming perforations 11 and 16 being in mating position.

Figure 2:
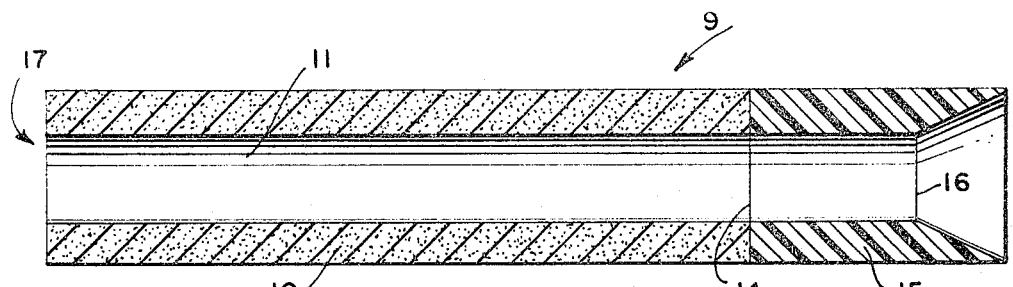
FIG. 2 is a modification of the design of FIG. 1 showing an open head end.

FIG. 2 shows a diagrammatic view of a modification of the chamberless propellant rocket 9 of FIG. 1, wherein the head end closure 13 shown in FIG. 1 is absent, thus forming an open head end 17 chamberless rocket.

Figure 3:
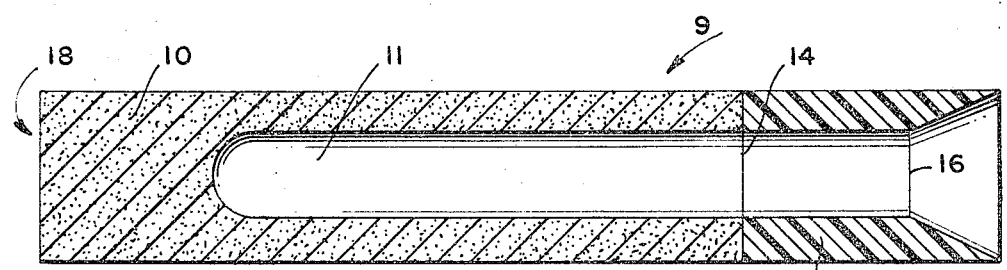
FIG. 3 is a modification of the design of FIG. 1 showing a propellant molded closed head end.

FIG. 3 shows a diagrammatic view of another modification of the chamberless rocket 9 of FIG. 1, wherein the head end 18 is closed and molded of the solid propellant grain material of section 10.

Figure 4:
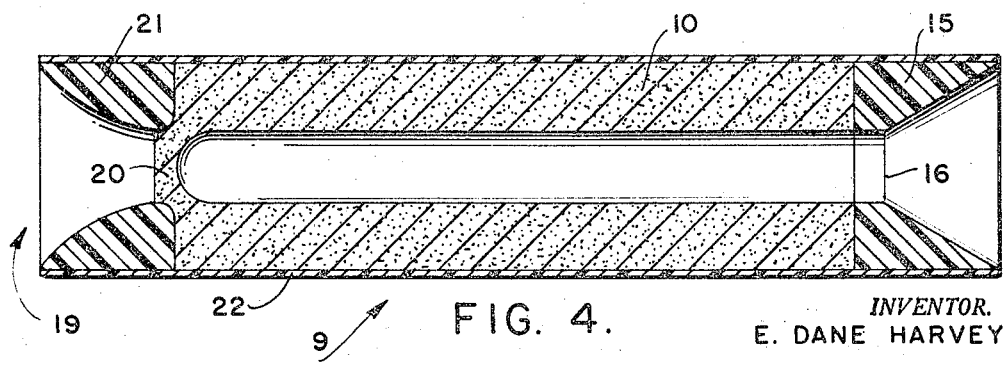
FIG. 4 is a diagrammatic view of a solid propellant rocket which may be a complete "ram rocket" in itself.

In FIG. 4 there is shown still another modification of the chamberless rocket of FIG. 1, wherein propellant grain section 10 is encased in a low energy plastic material 22. Nozzle 15 remains essentially the same as shown in FIG. 1, but the head end designated generally by numeral 19 is closed by a wall 20 of propellant material, and a compressor section 21 of low energy plastic material. This shows how a charge could be made to be a complete "ram rocket" in itself. In operation, forward wall 20 composed of propellant burns a sufficient time to allow the rocket to reach a desired velocity, then opens permitting air to enter forward compressor section 21 with subsequent ram action, resulting in considerable increase in impulse over that of the propellant alone.

Figure 5:
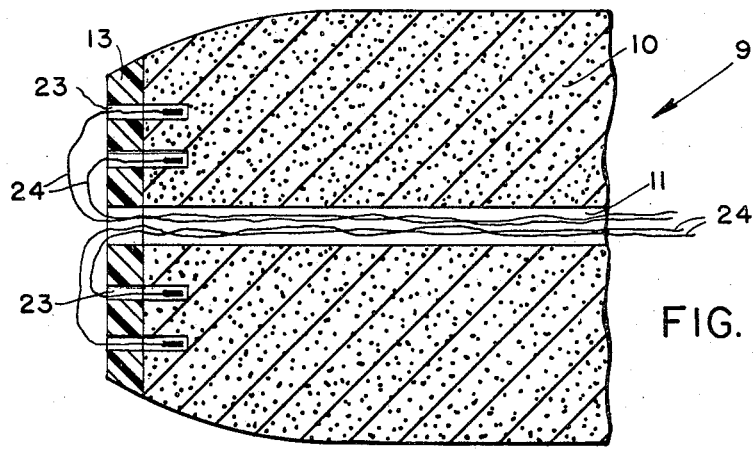
FIG. 5 is a fragmentary view of the aft end of a chamberless solid propellant rocket showing a method by which ignition may be initiated.

FIG. 5 shows a view of the head end of the chamberless rocket 9 wherein the head end 13 as shown in FIG. 1, is cast with bores or recesses 23 for insertion of squibs 24, or other ignition devices.

Rocket 9 can be advantageously prepared as a single casting by any suitable casting method. The general casting method comprises introducing a given mass of powder granules into a casting container and admitting liquid nonvolatile plasticizer upwardly through the mass in a manner such that the rate of use of the plasticizer, or casting solvent, forces air which may be present in the mass upwardly and out through the top. The plasticizer is introduced in an amount sufficient to contact and surround the individual granules. The resulting mixture is now adequately cured by suitable means, such as a forced air oven, to form a cast propellant free from entrapped air.

In accordance with the present invention as applied to FIG. 1, a body of low energy plastic material such as cellulose acetate (about 0.030″ diameter by 0.030″ long) is passed into the bottom end of an upright casting container in a volume and size desired to form end member 13 of propellant 9 (FIG. 1). A body of smokeless powder granules of volume and shape for formation of perforated grain 10 is superimposed in the container on plastic body 13 around a mold for forming the desired perforation geometry. Another body of granules of low energy plastic in the amount and size for formation of nozzle 15 is superimposed on the body of powder grains around a molding structure for forming nozzle 15.

A stream of nonvolatile casting solvent, generally consisting of 80% nitroglycerin, 19% triacetin, and 1% 2-nitrodiphenylamine, is then passed upwardly through the resulting column of granules from a point at the foot of said column so that the upward rise of solvent displaces air through the top of the casting container and completely contacts and surrounds the individual powder granules. Sufficient solvent is added to leave a liquid layer above the said column of from about .1 to .25 inch in depth. The resulting body, or charge, of granules and solvent is now cured in a forced air oven, generally at a temperature of about 140° F., then removed and cooled. The propellant so produced is a single casting of a perforate smokeless powder grain, with a plastic head end, and a plastic nozzle therefor which can be fired while serving as its own pressure chamber, i.e., without the need for a metal encasement.

The smokeless powder grain compositions utilized in this invention were as follows:

I

| | Percent |
|---|---|
| Nitrocellulose (12.6% nitrogen) | 60.6 |
| Nitroglycerin | 28.2 |
| Triacetin | 6.2 |
| Lead salicylate | 2.0 |
| 2-nitrodiphenylamine | 1.0 |
| Lead beta-resorcylate | 2.0 |
| Carbolac I (added) | 0.2 |

II

| | |
|---|---|
| Nitrocellulose (12.6% nitrogen) | 46.1 |
| Nitroglycerin | 39.1 |
| Triacetin | 9.2 |
| Lead salicylate | 1.9 |
| 2-nitrodiphenylamine | 1.6 |
| Lead beta-resorcylate | 1.9 |
| Carbolac I (carbon black) (added) | 0.2 |

The casting container is generally formed from a suitable combustion inhibitor material, cellulose acetate being utilized in this invention. The inhibitor in this instance forms a part of the propellant rocket and may be advantageously employed as a reinforcing medium for the propellant grain so that a somewhat increased pressure can be developed during combustion without danger of rupture of the grain.

It is, of course, not required that the casting container constitute an inhibitor material. It is within the scope of the invention to cast the propellant in a container designed to be removed prior to firing of the propellant. In such an embodiment, the removable container is made of any suitable material which will not adhere to the powder grain, such as glass, Saran, metal, or the like. Such a container may contain any suitably shaped webs for the formation of the designed geometry during casting, which can be removed prior to firing.

It is an important feature of the present invention that the propellant functions as a complete rocket by virtue of the low energy plastic elements described, i.e., the solid head end and the relatively short nozzle section. High overall impulse can be obtained by firing such nozzle grains, bared, or which may have alternatively been reinforced by inhibitor containers, or beakers, or which are corseted in a tight fitting tube, such as thick tubular aluminum. Thus, the expression "chamberless or caseless rocket" as used herein designates a bare rocket, i.e., one which is devoid of metal parts or, in any event, which is not completely encased by a conventional metal chamber and metal nozzle.

Low energy plastic compositions that have been utilized as nozzle and section elements of this invention are the cellulose acetate-based powders, of which the following are representative:

I

| | Percent |
|---|---|
| Cellulose acetate | 90 |
| Vaseline | 5 |
| Lead stearate | 5 |
| Titanium dioxide (added) | ½ |

II

| | |
|---|---|
| Cellulose acetate | 63 |
| Vaseline | 3½ |
| Lead stearate | 3½ |
| Nitroglycerin | 24 |
| Triacetin | 5.7 |
| 2-nitrodiphenylamine | 0.3 |
| Titanium dioxide (added) | 0.35 |

The selection of nozzle material is determined to a large degree by the propellant composition, and the grain geometry, inasmuch as the erosion effect of the ejected combustion gases on the nozzle throat must not be so great as to cause the nozzle to erode at a rate unduly high for sustaining equilibrium pressure. Selection of the plastic nozzle material and smokeless powder grain must be made together so as to maintain a balance between the increasing throat area that results from erosion, and the burning area. Thus, in burning a given powder composition the erosion constant of the nozzle material must be such that the erosion rate is not so high as to fail to sustain equilibrium pressure and not so low as to cause unduly high pressure to develop with concomitant rupture of the grain. Correlation of initial mass rate of gas production with erosion rate of the nozzle throat in order to sustain equilibrium pressure determines the selection of a specific nozzle material composition, or propellant geometry and composition, or both, as the case may be. Thus, the eroding nozzle balanced with burning area of the propellant gives a substantially constant product of pressure and nozzle throat area to provide for a nearly constant thrust throughout the entire burning time.

Although the present invention is illustrated showing a single perforation in the smokeless powder grain, it is equally applicable to grains having a plurality of perforations utilizing a single nozzle, or plurality, as desired. Further, perforations of various configurations, round, star-shaped, or otherwise, are within the scope of the invention.

It is an important feature of the present invention that in the ignition of the propellant it is only necessary to insert igniter means in the perforation so as to be in direct operative contact with the interior surface of the grain, the residual parts of the igniting element being then ejected from the rocket immediately after firing. One such ignition assembly is illustrated in FIG. 5. Other igniter assemblies such as bayonet igniter, bag igniter, or can igniter using black powder or any other oxidation-reduction type may be used.

The chamberless rocket of the invention is characterized by a pressure level that is highest on ignition, and drops smoothly as the grain burns, reaching a minimum value at burnout. Therefore, as the thickness of the propellant decreases during burning, the pressure also decreases which relaxes the need for external assistance to withstand a high pressure throughout the burning. The eroding case nozzle opens up to provide a value of the product of pressure and nozzle throat area which can be obtained so that a nearly constant thrust over the burning time is achieved.

The utmost in simplicity of solid propellant rockets is obtained when the bare grain is fired as cast, having no reinforcement or inhibitor whatsoever, but only a perforated grain with a solid head end and nozzle section as illustrated in FIG. 3. Several grains of this structure have been fired successfully, burning until a thin shell of propellant remains, then bursting, thereby providing a frangible rocket. This type rocket permits visual inspection of the grain, it being its own case and the loss of nitroglycerin is eliminated, there being no inhibitor.

When such a grain is cast in reinforced inhibitor, higher impulse levels may be realized by operating at higher pressures than in the case of the bare grain.

Figure 6:
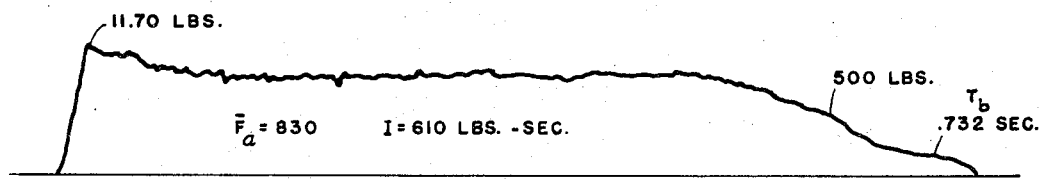
FIG. 6 shows a record of the pressure-time and thrust-time curves for the open head end rocket.
Figure 7:
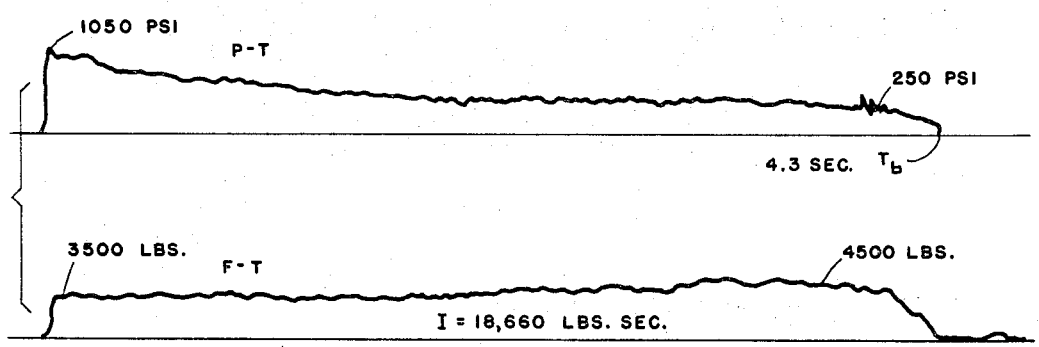
FIG. 7 shows records of the pressure-time and thrust-time curves for the solid head-end chamberless rocket.

The tests conducted on the "chamberless" or "caseless" propellant grain-rocket used the cellulose acetate powder mixture disclosed herein as the nozzle material. FIGS. 2 and 3 diagrammatically illustrate the grains made with open and closed head ends, respectively. FIG. 6 shows a sample ballistic thrust time curve for the open head end grain (FIG. 2) and FIG. 7 shows pressure-time and thrust-time records of the solid head end grain (FIG. 3).

Figure 8:
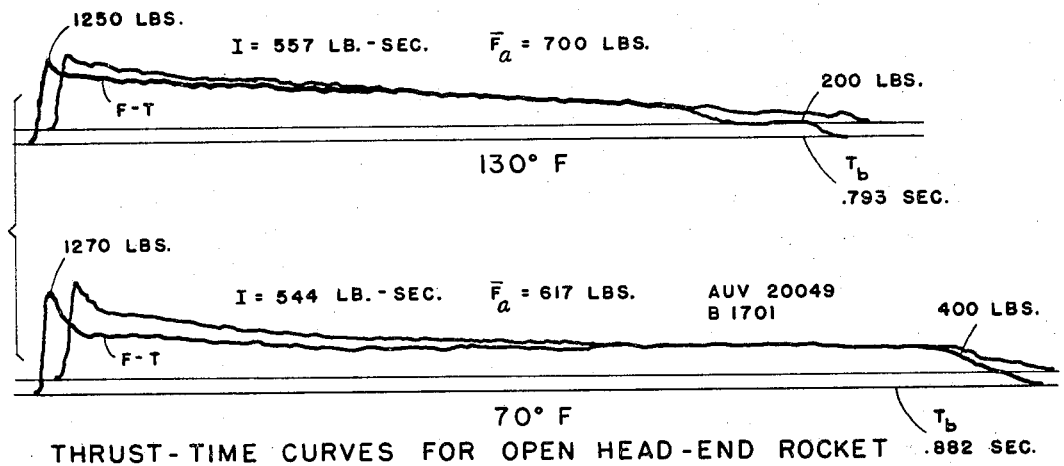
FIG. 8 shows records of the thrust-time curves for chamberless rockets tested at 70° and 130° F.
Figure 9:
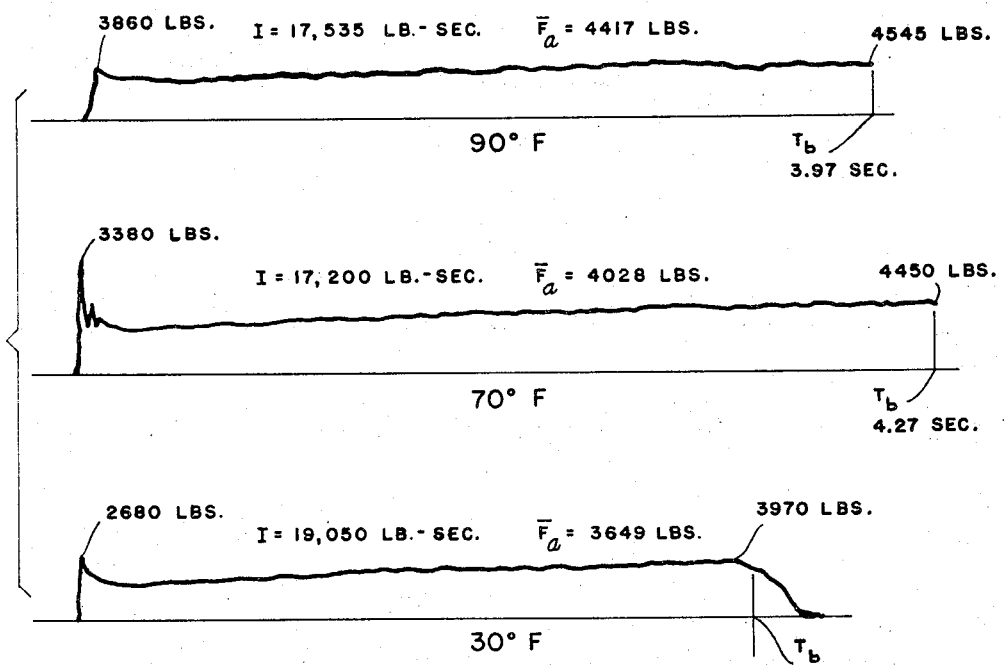
FIG. 9 shows records of the thrust-time curves for chamberless rockets tested at 30°, 70°, and 90° F.

A study was conducted to determine whether or not grains of this type with small inside diameters for a given length when fired would produce an increase in impulse. It was discovered as a result of this study that a 1-inch-internal diameter charge yielded very smooth pressure-time and thrust curves. Several firings were made using 1-inch-internal diameter, 48-inch-long charges; the records at 70° and 130° F. are shown in FIG. 8. A 106-inch-long charge was fired successfully at temperatures of 70°, 90° and 30° F. At 70° and 90° the charges failed when the wall thickness reached about .25", while the 30° round burned all the way to the restriction. Thrust curves for these three rounds are presented in FIG. 9. The chamberless rocket of this invention became a reality with the use of the 1-inch-internal diameter charge.

Obviously many modifications and variations of the present invention are possible in the light of the above teachings. For example, grouping the grains in clusters by binding them together with a band of low energy plastic material is feasible. It is therefore to be understood that within the scope of the appended claim the invention may be practiced otherwise than as specifically described.

What is claimed:

1. A caseless rocket propellant comprising a perforated smokeless powder grain, a first section, closed, consisting essentially of cellulose acetate, connected with one end of said grain and forming an end section therefor; and a second section, perforated, consisting of cellulose acetate, and connected to the opposite end of said powder grain as a nozzle member therefor; said powder grain consisting essentially of from 46 to 61% nitrocellulose, from 39 to 29% nitroglycerin, from 6 to 9.5% triacetin, from 1.5 to 2% lead salicylate, from 1 to 1.6% 2-nitrodiphenylamine, and from 1.5 to 2% lead beta-resorcylate.

References Cited

UNITED STATES PATENTS

| | | | |
|---|---|---|---|
| 2,661,692 | 12/1953 | Vegren | 60—35.6 |
| 2,995,011 | 8/1961 | Kimmel | 60—35.6 |
| 3,010,355 | 11/1961 | Cuttforth | 86—1 |
| 3,017,746 | 1/1962 | Kiphart | 60—35.6 |
| 3,019,687 | 2/1962 | Gongwer | 86—1 |
| 3,032,970 | 5/1962 | Fox | 60—35.3 |
| 3,032,972 | 5/1962 | Preckel | 149—98 X |
| 3,088,858 | 5/1963 | Camp | 149—98 X |

OTHER REFERENCES

Jet Propulsion Magazine, February 1956, pp. 102–105, "The Family Free of Charge Designs," by J. M. Vogel.

CARLTON R. CROYLE, *Primary Examiner.*

SAMUEL FEINBERG, BENJAMIN A. BORCHELT, *Examiners.*

R. F. STAHL, *Assistant Examiner.*